United States Patent [19]

Takaragi et al.

[11] Patent Number: 5,222,139

[45] Date of Patent: Jun. 22, 1993

[54] CRYPTOGRAPHIC METHOD AND APPARATUS

[75] Inventors: Kazuo Takaragi, Ebina; Tsutomu Nakamura, Musashino; Masahiro Yamashita, Hiratsuka; Kazuo Hashimoto, Hadano; Hiroshi Matsumoto, Sagamihara, all of Japan

[73] Assignees: Hitachi, Ltd., Tokyo; Hitachi Chubu Software, Ltd., Aichi, both of Japan

[21] Appl. No.: 785,810

[22] Filed: Oct. 31, 1991

[30] Foreign Application Priority Data

Nov. 2, 1990 [JP] Japan ................... 2-295351

[51] Int. Cl.$^5$ ............................................. H04K 1/00
[52] U.S. Cl. ......................................... 380/28; 380/44
[58] Field of Search .................................. 380/28, 44

[56] References Cited

U.S. PATENT DOCUMENTS 4,982,429 1/1991 Takaragi et al. ..................... 380/28

OTHER PUBLICATIONS

"On Differential Cryptanalysis", IEICE Transaction, VE74N8, Aug. 1991 pp. 2153-2159.
Koyama et al. "Modern Theory of Encryption", Sep. 1986.
Shimizu et al., "Fast Data Encipherment Algorithm FEAL" pp. 1413-1423.
A. Shimizu et al., "A Fast 32-bit Microprocessor Oriented Data Encipherment Algorithm", *The Transactions of the IEICE*, vol. E 73, No. 7, Jul. 1990, pp. 1045-1050.

*Primary Examiner*—David Cain

*Attorney, Agent, or Firm*—Antonelli, Terry, Stout & Kraus

[57] ABSTRACT

Cryptographic techniques for enciphering computer messages or the like include a unit for generating a cipher program for enciphering message data or plaintext by using a plurality of kinds of basic involution processing programs and desired key data, and a unit for enciphering the message data into ciphertext by executing the generated cipher program for the message data. A part of the involution processing program includes a substitution transformation portion and a permutation transformation portion. In accordance with the bit pattern of the above key data, a sequence for executing each of the involution processing programs and a sequence for executing the substitution transformation portion and the permutation transformation portion are determined. The above plurality of transformation processes include an operation of circular shifting to the right or left by X bits and an operation of circular shifting to the right or left by Y bits, with the X and Y being mutually different numbers. An indication of detailed numerical values of the X and Y and the right or left direction for a circular shift is given by key data. According to the above structure, a part of the functions for structuring the encipherment algorithms and the sequence for executing the functions are changed by key data. With the above arrangement, a large amount of algorithm transformation patterns are generated by the product of a number of changes of a part of the functions and a sum of combinations of permutation in the sequence of executing the functions, thus making it extremely difficult to crack the algorithms.

12 Claims, 18 Drawing Sheets

SYSTEM CONFIGURATION

SYSTEM CONFIGURATION

SYSTEM PROCESSING PROCEDURE

CONFIGURATION OF 32-BIT PROCESSOR 106

FIG. 5A

| STEP | INVOLUTION | FUNCTION | INPUT | | ARITHMETIC OPERATION | | OUTPUT | |
|---|---|---|---|---|---|---|---|---|
| | | | GATE A | CIRCULAR SHIFT | OTHER ARITHMETIC OPERATION | | GATE B | |
| 501 | $\pi_1$ | EOR | R | 0 | EOR | | RESULT→R | |
| 502 | | P21 | $W_1$ | 0 | + | | — | |
| 503 | $\pi_2$ | P22 | X | $L_1(L_2, R_1, R_2)$ | $+-1(++1)$ | | — | |
| 504 | | P23 | X | $L_4$ | EOR | | — | |
| 505 | | EOR | L | 0 | EOR | | RESULT→L.[$W_1$] | |
| 506 | | P31 | $W_2$ | 0 | + | | — | |
| 507 | | P32 | X | $L_2(L_1, R_1, R_2)$ | $++1(+-1)$ | | — | |
| 508 | $\pi_3$ | P33 | X | $L_8$ | EOR | | — | |
| 509 | | P34 | $W_3$ | 0 | + | | — | |
| 510 | | P35 | X | $L_1(L_2, R_1, R_2)$ | $-(+, +1, -\pm1)$ | | — | |
| 511 | | P36 | L | $L_{16}$ | $V(\Lambda)$, EOR$(+, -)$ | | — | |
| 512 | | EOR | R | 0 | EOR | | RESULT→R.[$W_2$] | |
| 513 | | P41 | $W_4$ | 0 | + | | — | |
| 514 | $\pi_4$ | P42 | X | $L_2(L_1, R_1, R_2)$ | $++1(+-1)$ | | — | |
| 515 | | EOR | L | 0 | EOR | | RESULT→L.[$W_3$] | |

FIG. 5B

| STEP | INVOLUTION | FUNCTION | INPUT | | ARITHMETIC OPERATION | | OUTPUT |
|---|---|---|---|---|---|---|---|
| | | | GATE A | CIRCULAR SHIFT | OTHER ARITHMETIC OPERATION | | GATE B |
| 516 | $\pi_1$ | EOR | R | 0 | EOR | | RESULT→R.[$W_4$] |
| 517 | $\pi_2$ | P21 | $W_5$ | 0 | + | | — |
| 518 | | P22 | X | $L_1(L_2, R_1, R_2)$ | $+ -1 (+ -1)$ | | — |
| 519 | | P23 | X | $L_4$ | EOR | | — |
| 520 | | EOR | L | 0 | EOR | | RESULT→L.[$W_6$] |
| 521 | $\pi_3$ | P31 | $W_6$ | 0 | + | | — |
| 522 | | P32 | X | $L_2(L_1, R_1, R_2)$ | $++1 (+ -1)$ | | — |
| 523 | | P33 | X | $L_8$ | EOR | | — |
| 524 | | P34 | $W_7$ | 0 | + | | — |
| 525 | | P35 | X | $L_1(L_2, R_1, R_2)$ | $-(+, +1, -+1)$ | | — |
| 526 | | P36 | L | $L_{16}$ | $\vee (\wedge)$, EOR $(+, -)$ | | — |
| 527 | | EOR | R | 0 | EOR | | RESULT→R.[$W_6$] |
| 528 | $\pi_4$ | P41 | $W_8$ | 0 | + | | — |
| 529 | | P42 | X | $L_2(L_1, R_1, R_2)$ | $++1(+ -1)$ | | — |
| 530 | | EOR | L | 0 | EOR | | RESULT→L.[$W_7$] |
| 531 | $\pi_1$ | EOR | R | 0 | EOR | | RESULT→R.[$W_8$] |

ALGORITHM KEY A (64 BITS)

EXAMPLE OF ALGORITHM KEY B

```
    1       6 9       16                      32
W7 │0 1 1 0 1 1 0 0 0 1 0 0 1 0 1 0 0 0 1 0 0 0 0 0 1 0 1 1 0 0 0 1│
                                                           └─1201

1       6 9       16                      32
W8 │1 1 0 1 0 1 1 0 1 1 1 1 1 0 0 1 1 0 1 1 0 1 1 1 1 0 1 0 0 0 1│
                                                           └─1202
```

PROCESSING PROCEDURE OF CIPHER PROGRAM GENERATION

CONFIGURATION OF ALGORITHM KEY B

701 EXECUTION SEQUENCE OF $\pi_1$ TO $\pi_4$
702 EXECUTION SEQUENCE OF $P_{21}$ TO $P_{23}$ IN $\pi_2$
703 EXECUTION SEQUENCE OF $P_{31}$ TO $P_{35}$ IN $\pi_3$
704 EXECUTION SEQUENCE OF $P_{41}$ AND $P_{42}$ IN $\pi_4$
705 OPERATOR OF $P_{22}$
706 OPERATOR OF $P_{32}$
707 OPERATOR OF $P_{35}$
708 OPERATOR OF $P_{36}$
709 OPERATOR OF $P_{42}$

FIG. 10A
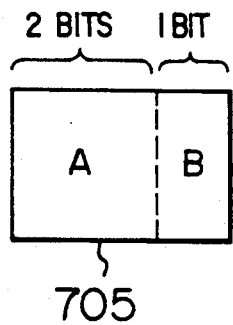
705
FIG. 10B
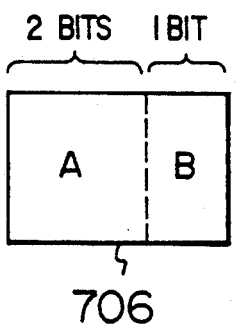
706
FIG. 10C
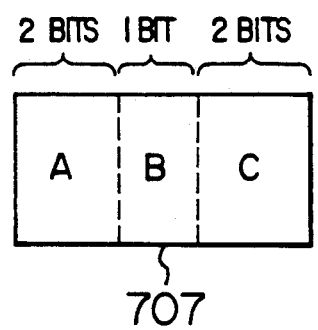
707
FIG. 10D
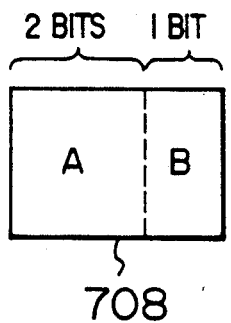
708
FIG. 10E
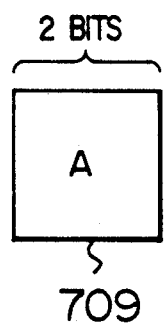
709
FIG. 10F
| BIT PATTERN | 705 P22 | | 706 P32 | | 707 P35 | | | 708 P36 | | 709 P42 |
|---|---|---|---|---|---|---|---|---|---|---|
| | A | B | A | B | A | B | C | A | B | A |
| 00 | $L_1$ | −1 | $L_2$ | +1 | $L_1$ | − | 0 | EOR | V | $L_2$ |
| 01 | $L_2$ | +1 | $L_1$ | −1 | $L_2$ | + | +1 | + | ∧ | $L_1$ |
| 10 | $R_1$ | | $R_2$ | | $R_1$ | | −1 | − | | $R_2$ |
| 11 | $R_2$ | | $R_1$ | | $R_2$ | | 0 | EOR | | $R_1$ |

FIG. 11A

| STEP | INVOLUTION | FUNCTION | INPUT GATE A | ARITHMETIC OPERATION CIRCULAR SHIFT | ARITHMETIC OPERATION OTHER ARITHMETIC OPERATION | OUTPUT GATE B |
|---|---|---|---|---|---|---|
| 801 |  | P32 | X | L2 | +,+ | — |
| 802 | π3 | P34 | W1 | 0 | + | — |
| 803 |  | P31 | W2 | 0 | + | — |
| 804 |  | P35 | X | L1 | +,+ | — |
| 805 |  | P33 | X | L8 | EOR | — |
| 806 |  | P36 | L | L16 | V,— | — |
| 807 | π1 | EOR | R | 0 | EOR | RESULT→R. |
| 808 |  | EOR | L | 0 | EOR | RESULT→L.[W1] |
| 809 | π4 | P41 | W3 | 0 | + | — |
| 810 |  | P42 | X | L1 | +,+ | — |
| 811 |  | EOR | R | 0 | EOR | RESULT→R.[W2] |
| 812 | π3 | P22 | X | L1 | +,+ | — |
| 813 |  | P23 | X | L4 | EOR | — |
| 814 |  | P21 | W4 | 0 | + | — |
| 815 |  | EOR | L | 0 | EOR | RESULT→L.[W3] |

FIG. 11B

| STEP | INVOLUTION | FUNCTION | INPUT | | ARITHMETIC OPERATION | | OUTPUT |
|---|---|---|---|---|---|---|---|
| | | | GATE A | CIRCULAR SHIFT | OTHER ARITHMETIC OPERATION | | GATE B |
| 816 | π1 | EOR | R | 0 | | EOR | RESULT→R.[W4] |
| 817 | | P31 | W5 | 0 | + | | — |
| 818 | π3 | P33 | X | L8 | | EOR | — |
| 819 | | P32 | X | R1 | ++1 | | — |
| 820 | | P34 | W6 | 0 | + | | — |
| 821 | | P35 | X | R2 | +−1 | | — |
| 822 | | P36 | R | L16 | V, − | | — |
| 823 | | EOR | L | 0 | | EOR | RESULT→L.[W5] |
| 824 | π2 | P21 | W7 | 0 | + | | — |
| 825 | | P22 | X | R2 | +−1 | | — |
| 826 | | P23 | X | L4 | | EOR | — |
| 827 | | EOR | R | 0 | | EOR | RESULT→R.[W6] |
| 828 | π4 | P42 | X | L1 | ++1 | | — |
| 829 | | P41 | W8 | 0 | + | | — |
| 830 | | EOR | L | 0 | | EOR | RESULT→L.[W7] |

FIG. 11C

| STEP | INVOLUTION | FUNCTION | INPUT | ARITHMETIC OPERATION | | OUTPUT |
|---|---|---|---|---|---|---|
| | | | GATE A | CIRCULAR SHIFT | OTHER ARITHMETIC OPERATION | GATE B |
| 831 | | P32 | X | $L_2$ | +,+1 | — |
| 832 | | P34 | $W_1$ | 0 | + | — |
| 833 | $\pi 3$ | P31 | $W_2$ | 0 | + | — |
| 834 | | P35 | X | $L_1$ | +,+1 | — |
| 835 | | P33 | X | $L_8$ | EOR | — |
| 836 | | P36 | L | $L_{16}$ | V, − | — |
| 837 | | EOR | R | 0 | EOR | RESULT → R.[$W_8$] |

CRYPTOGRAPHIC METHOD AND APPARATUS

BACKGROUND OF THE INVENTION

The present invention relates to cryptographic method and apparatus for enciphering messages of a computer or the like.

Currently, many enterprises have been reinforcing their information network facilities for the purpose of their businesses. It is anticipated, that, in the near future, information exchanges are going to be carried out frequently among a plurality of organizations having a variety of transaction relationships with each other, not being restricted to only within one organization. Under such circumstances, ciphers are indispensable in order to assure securities of communications.

Ciphers are broadly classified into two types, that is, common key ciphers and public key ciphers. Common key cipher is used to encipher or decipher a large volume of data and to generate message authentication codes.

Public key cipher is used to secretly distribute common keys between communicating parties and to make digital signatures. Common key cipher is used to encipher and decipher messages between a message transmitter and a receiver such that the transmitter transforms a message by using a common key and transmits a ciphertext and that the receiver of the ciphertext deciphers the ciphertext to transform the ciphertext into the original message by using the same common key, under the assumption that the transmitter and the receiver share the same key (common key).

As conventional typical encipher algorithms, the DES algorithm (Data Encryption Standard) and the FEAL algorithm (Fast Encipherment Algorithm) have been known. The DES algorithm has been described in detail, for instance, (1) Koyama et al., "Modern Theory of Encryption", The Institute of Electronics and Communication Engineers of Japan, pages 41 to 49, September 1986. On the other hand, the FEAL algorithm has been described in detail in, (2) Shimizu et al., "Fast Data Encipherment Algorithm FEAL", Papers of the Institute of Electronics and Communication Engineers of Japan, D. Vol. J70-D, No. 7, pages 1413 to 1423, July 1987.

As approaches for improving the efficiency of both data scrambling (data ramdomizing) and processing speed, there have been known "Multi-Media Encryption Algorithm" (Information Processing Society of Japan, Study Group of Multi-Media Communication and Decentralized Processing, Jan. 19, 1989) and an encryption algorithm (hereinafter to be referred to as MULTI 2) disclosed in U.S. Pat. No. 4,982,429 by the inventors of the present invention.

MULTI 2 is operated to obtain 64 bits of a ciphertext by executing operations of basic functions (involution functions) $\pi_1$ to $\pi_4$ to a plaintext of 64-bit length including upper 32 bits and lower 32 bits, in a predetermined sequence, as shown in FIG. 14.

In FIG. 14, $\oplus$ denotes an exclusive logical OR for each bit, + an addition using $2^{32}$ as a modulus, $ROT_n$ a cyclic shift of n bits, a V a logical OR for each bit.

It is known, that, in general, there is a risk that encipher keys used in a statement are vulnerable to be conjected and ciphertexts are deciphered illegally as a result, by a method of analyzing plaintexts which have been given to an encryption algorithm and a ciphertext which has been generated by using the plaintexts (a so-called chosen plaintext attack), even if the encryption algorithm is considered to have a considerable degree of randomness (refer to Boer, "Crypta-analysis of F.E.A.L.", Proc. EUROCRYPTO, 1987).

Therefore, the above-described conventional algorithm cannot necessarily continue to be safe in future.

In order to prevent a chosen plaintext attack, it is effective to use both an applicational countermeasure, such as reducing the cycle of altering encipher keys and a technical countermeasure, such as further complicating the encryption algorithm itself, to thereby avoid an attack of decipherment. As the latter technical countermeasure, increasing the frequency of involution transformation has been proposed in the DES, EFEL-8 and MULTI 2 (Takaragi, et al., "Development of Multi-Media Encryption Algorithm HISECURITY MULTI 2 and Its Operation Mode", The Institute of Electronics and Communication Engineers of Japan", WCIs' 89-D2, Aug. 28–30, 1989 and H. J. Highland, "Cracking the DES ?", Computers & Security, 8, 1989, pp. 274–275).

No optimum number of repetition of involutions, however, has ever been known. In other words, either a level of number of repetitions above which ciphertexts are safe or a level of number of repetition below which ciphertexts are vulnerable to a decipher attack has never been known. Accordingly, there has been no alternative method except that number of repetitions of involutions is increased to an excessive level by taking into account a safety margin. On the other hand, an increase in the number of repetitions of involutions has a problem that a speed of transforming ciphers becomes slower in inverse proportion to the increase in the number of repetitions.

SUMMARY OF THE INVENTION

It is an object of the present invention to provide cryptographic method and apparatus which can encipher message data at a high speed and can assure a high safety level.

It is another object of the present invention to provide a one-chip enciphering processor suitable for a high-speed encipherment processing.

In order to achieve the above objects, a cryptographic system according to one aspect of the present invention includes a unit for generating an encryption program to encipher message data (a plaintext) by using a plurality of kinds of involution processing programs and desired key data which become the basis of encipherment, and a unit for transforming the above message data into a ciphertext by executing the program generated for the message data.

A substitution transformation portion and a permutation transformation portion are included in a part of the above involution processing program. In accordance with bit patterns of the key data, a sequence of executing each of the involution processing programs and a sequence of executing the substitution transformation portion and the permutation transformation portion within each of the involution processing programs are determined.

The plurality of permutation processings include operations of circular shifting by X bits to the right or to the left and operations of circular shifting by Y bits to the right or to the left, with the X and Y being mutually different numbers, and detailed numerical values of the X and Y and an indication of either the right direction or the left direction is given by key data.

The above plurality of substitution transformation includes circular shift instructions for instructing right or left circular shift, and modular addition or subtraction instructions. An indication of how to combine each instructions and how to structure the substitution transformation processing is given by key data.

According to another aspect of the present invention, in an apparatus for enciphering message data by combining a substitution transformation processing and a permutation transformation processing to scramble data by using different functions, an on-chip enciphering processor includes an input buffer for holding a plurality of kinds of input keys, an output buffer, a control program portion to which an encryption program and a transformation encryption program are to be inputted, an operation unit for generating an algorithm determination key to generate a transformation encryption program by carrying out a predetermined operation based on key data from the input buffer under the control of a program from the control program portion and for generating a ciphertext by carrying out a predetermined operation based on message data, and an output buffer for holding and for outputting an algorithm determination key and a ciphertext of message data that have been generated.

According to still another aspect of the present invention, the above operation unit includes first and second set registers, a plurality of operation units for carrying out repetitive operations by receiving outputs from the registers, and an OR unit for giving an output of the operation unit by carrying out an OR at the output of the first and second set registers. The first and second set registers set the first algorithm determination key, that has been determined in advance by communicating parties to determine an algorithm, so that a system key that has been determined by closed users can be inputted. The plurality of operation units repeat encryption operations for the inputs applied from the first and second set registers, update the control program portion based on the result of the operations and set the second set register by generating an effective key. Under the control of the transformation encryption program from the updated control program portion, the operation unit executes a predetermined cyclic cryptographic operation for the message data to be enciphered, based on the output from the first set register to which data keys determined by common parties have been inputted and the output from the second set register to which the second system key determined by closed users has been inputted, and outputs the output data of the first set register as a result of the execution, as an enciphered message.

According to the present invention, a part of the functions structuring an encipherment algorithm and a sequence of executing the functions change based on key data. With the above-described arrangement, a large amount of algorithm transformation patterns are generated by the product of a number of changes of a part of the functions and a sum of combinations of permutation in the sequence of executing the functions, thus making it extremely difficult to crack the algorithms. As a result, a common key encipherment algorithm which is strong against a cracking of algorithm can be realized without substantially deteriorating transformation speed of encipherment and decipherment as compared with the conventional cryptographic system.

BRIEF DESCRIPTION OF THE DRAWINGS

FIGS. 5A and 5B are diagrams for explaining detail of a cipher program A;

FIGS. 10A to 10F are diagrams for explaining details relating to a portion for determining operators;

FIGS. 11A, 11B and 11C are diagrams for showing detailed examples of the cipher program B;

DESCRIPTION OF THE PREFERRED EMBODIMENTS

Embodiments of the present invention will be explained in detail.

Figure 1:
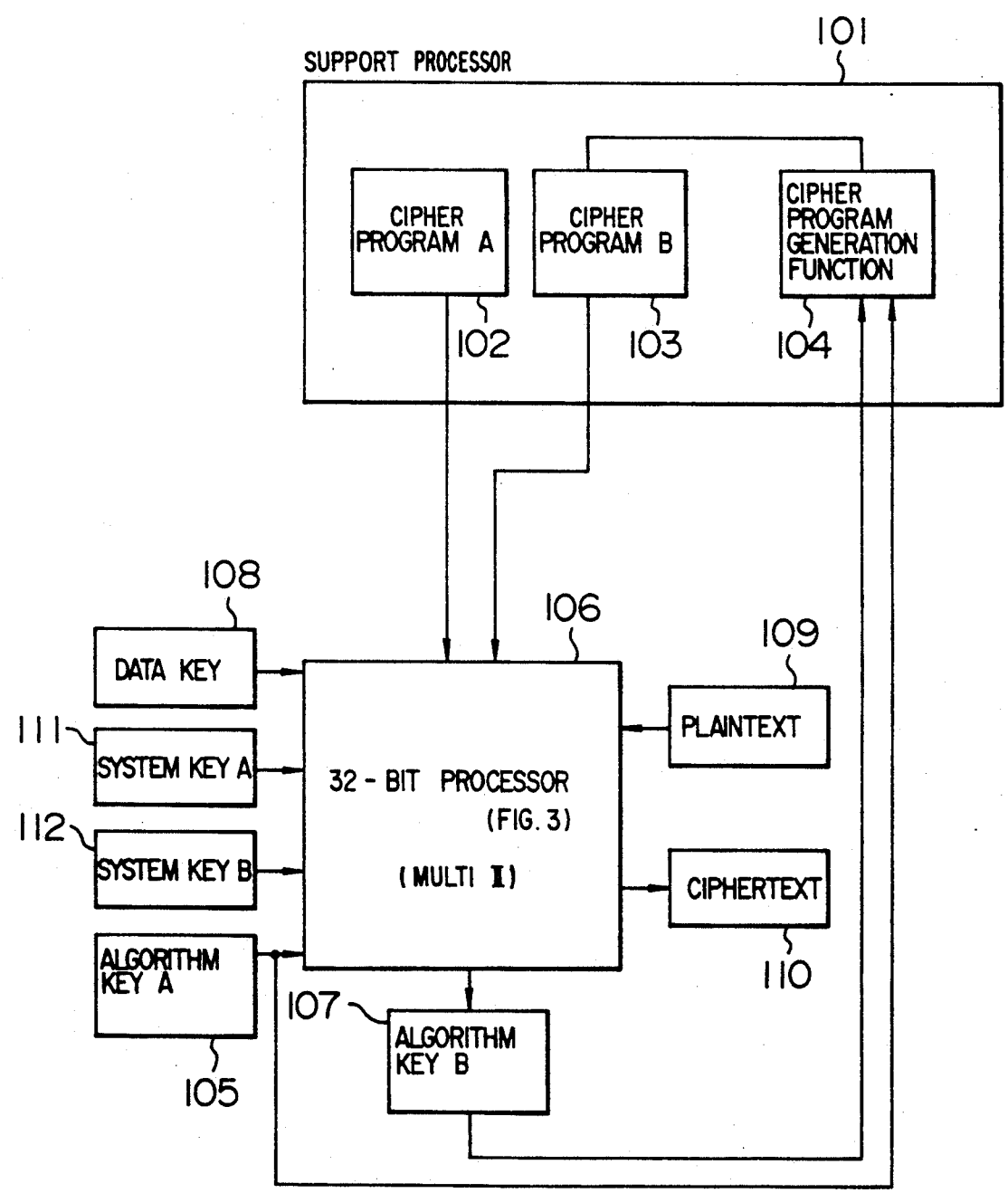
FIG. 1 is a block configuration diagram of a cryptographic apparatus for executing the present invention.
Figure 2:
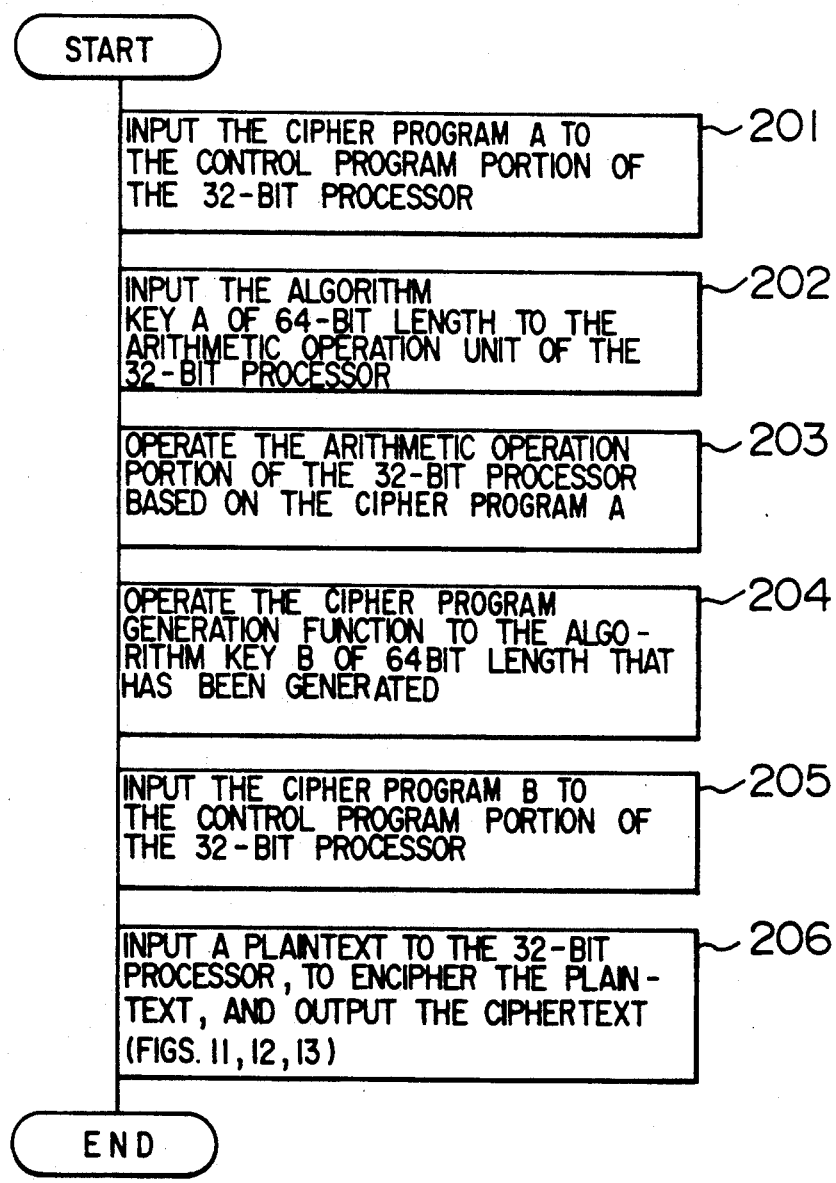
FIG. 2 is a diagram for showing a flow chart of the process of cipher transformation.

FIG. 1 is a system configuration diagram and FIG. 2 is a diagram for showing a system processing procedure. The system includes a 32-bit processor (106) for executing cipher programs A and B and a support processor (101) for generating the encryption program B. A processing procedure for the system as a whole will be explained first.

Step 201: Input a cipher program A (102) from the support processor (101) to the 32-bit processor (106).

Step 202: Input an algorithm determination key A (105) of 64-bit length and a system key A (111) of 32 bits×8=356 bit-length to the 32-bit processor (106).

The system key A (111) is a key to be defined by a group of closed users, and, generally, this key is updated on yearly basis, for example.

Step 203: Operate the 32-bit processor (106) to generate an algorithm determination key B (107) of 64-bit length.

The algorithm determination key B (107) is defined by communicating parties, to determine an algorithm.

Step 204: Send the algorithm determination key B (107) of 64-bit length that has been generated to the support processor (101), to activate a cipher program generation function portion (104).

Step 205: The encryption program generation function portion (104) generates a cipher program B (103) based on the algorithm determination key B (107) of 64-bit length, and then inputs the cipher program B (103) to the 32-bit processor (106).

Step 206: The 32-bit processor (106) enciphers a plaintext (109) by using the data key (108) to be defined by common parties and the system key B (112) to be defined by closed parties, as parameters, under the control of the cipher program B (103). The 32-bit processor (106) outputs a ciphertext (110) which has been obtained as a result of the encipherment.

Generally, the system key B (112) has a shorter cycle of updating than the system key A (111). For example, the system key B (112) is updated daily.

Figure 3:
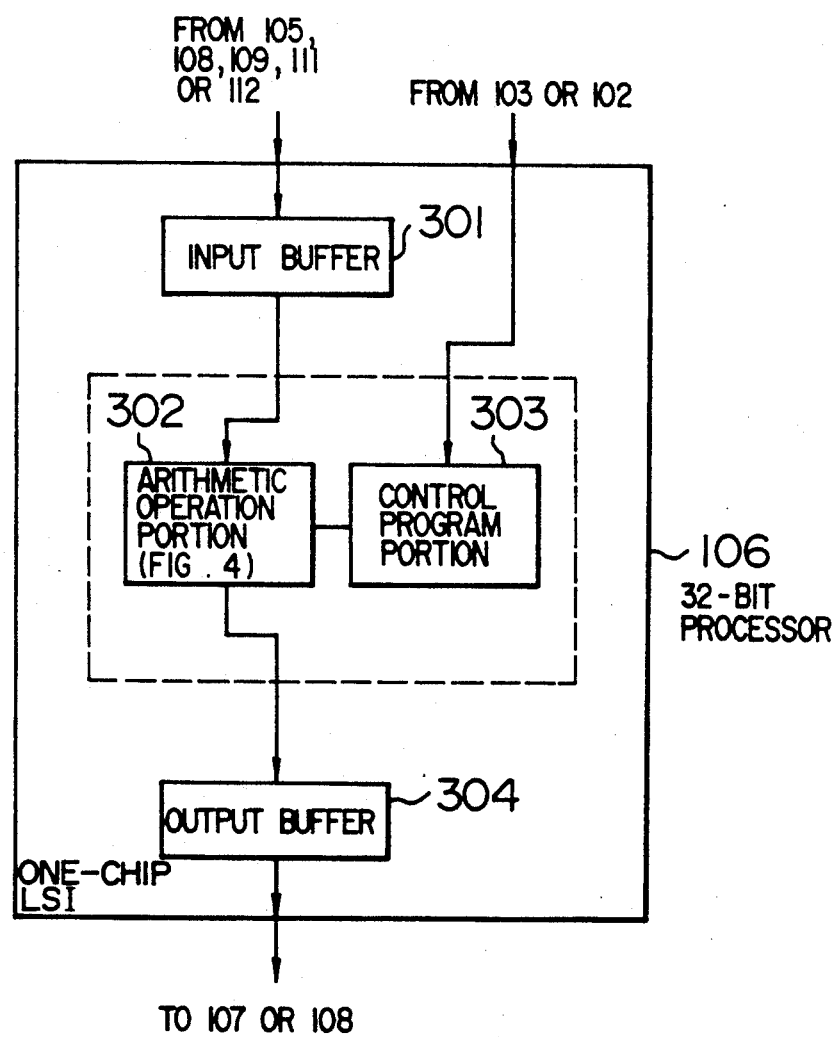
FIG. 3 is a diagram for showing a configuration of a 32-bit processor (106)

FIG. 3 is a diagram for showing a configuration of the 32-bit processor (106). The 32-bit processor (106) includes a control program portion (303), an arithmetic operation portion (302) for carrying out an arithmetic operation based on a control signal sent from the control program portion, an input buffer (301) for holding input data to the arithmetic operation portion, and an output buffer (304) for holding output data from the arithmetic operation portion.

Figure 4:
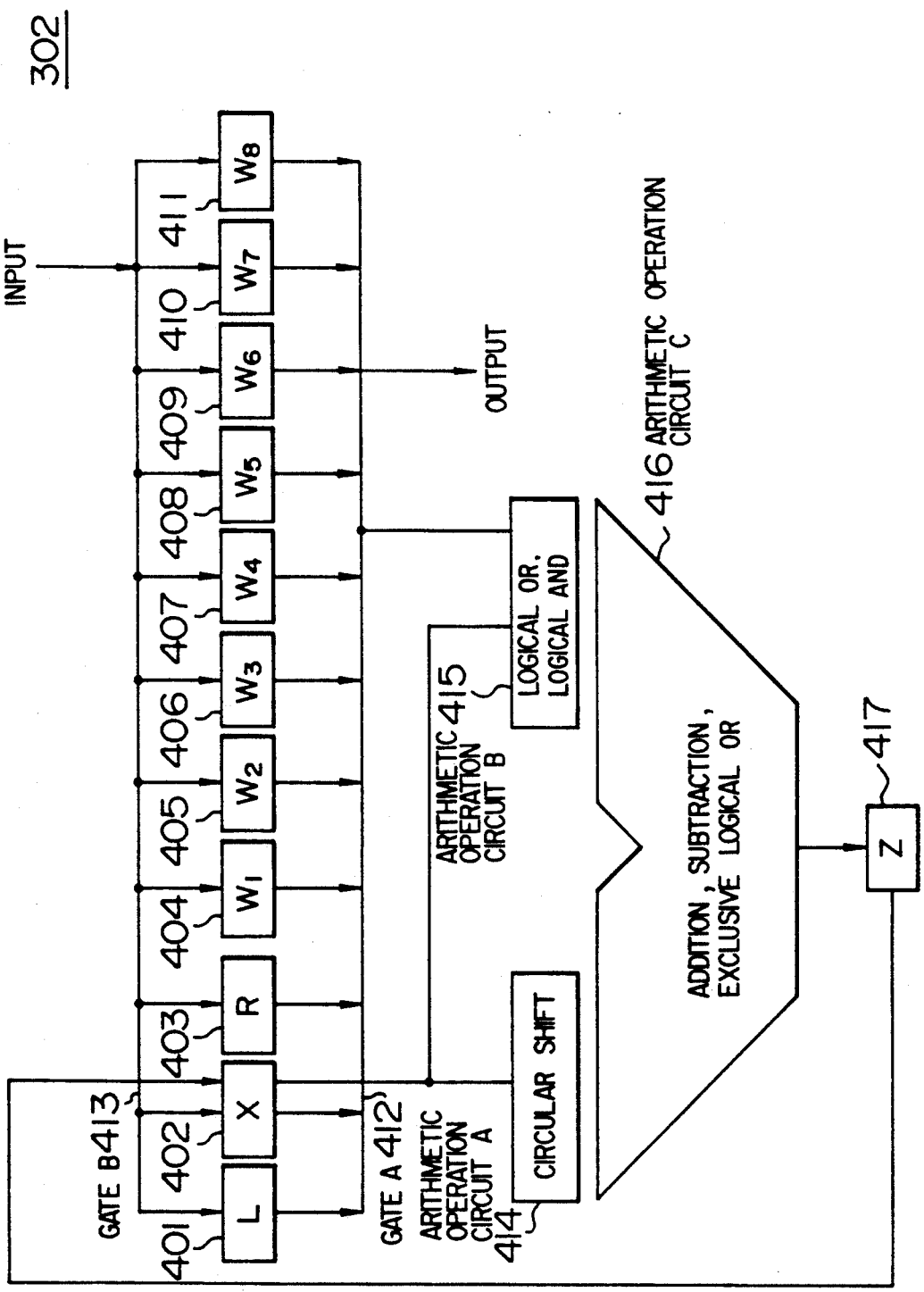
FIG. 4 is a diagram for showing details of an arithmetic operation portion (302)

FIG. 4 is a diagram for explaining the details of the arithmetic operation portion (302), and FIG. 5 is a diagram for explaining the details of the cipher program A (102) to be stored initially in the control program portion (303).

The processing procedure for generating the algorithm determination key B (201 to 203) in FIG. 2 will be explained in further detail with reference to FIG. 4 and FIGS. 5A and 5B.

The cipher program A (102) which has been inputted to the 32-bit processor (106) in Step 201 is stored in the control program portion (303).

The algorithm determination key A (105) of 64-bit length which has been inputted in Step 202 is divided into upper 32 bits and lower 32 bits. The upper 32 bits are stored in a 32-bit register L (401) and a 32-bit register X (402) in the arithmetic operation portion (302), respectively, and the lower 32 bits are stored in a 32-bit register R (403).

The system key A (111) of 32-bits×8=256-bit length which has been defined by the system is divided into eight portions each having 32 bits. The eight portions are stored in 32-bit registers $W_1$ (404) to $W_8$ (411) through an input buffer (301) respectively.

Figure 6A:
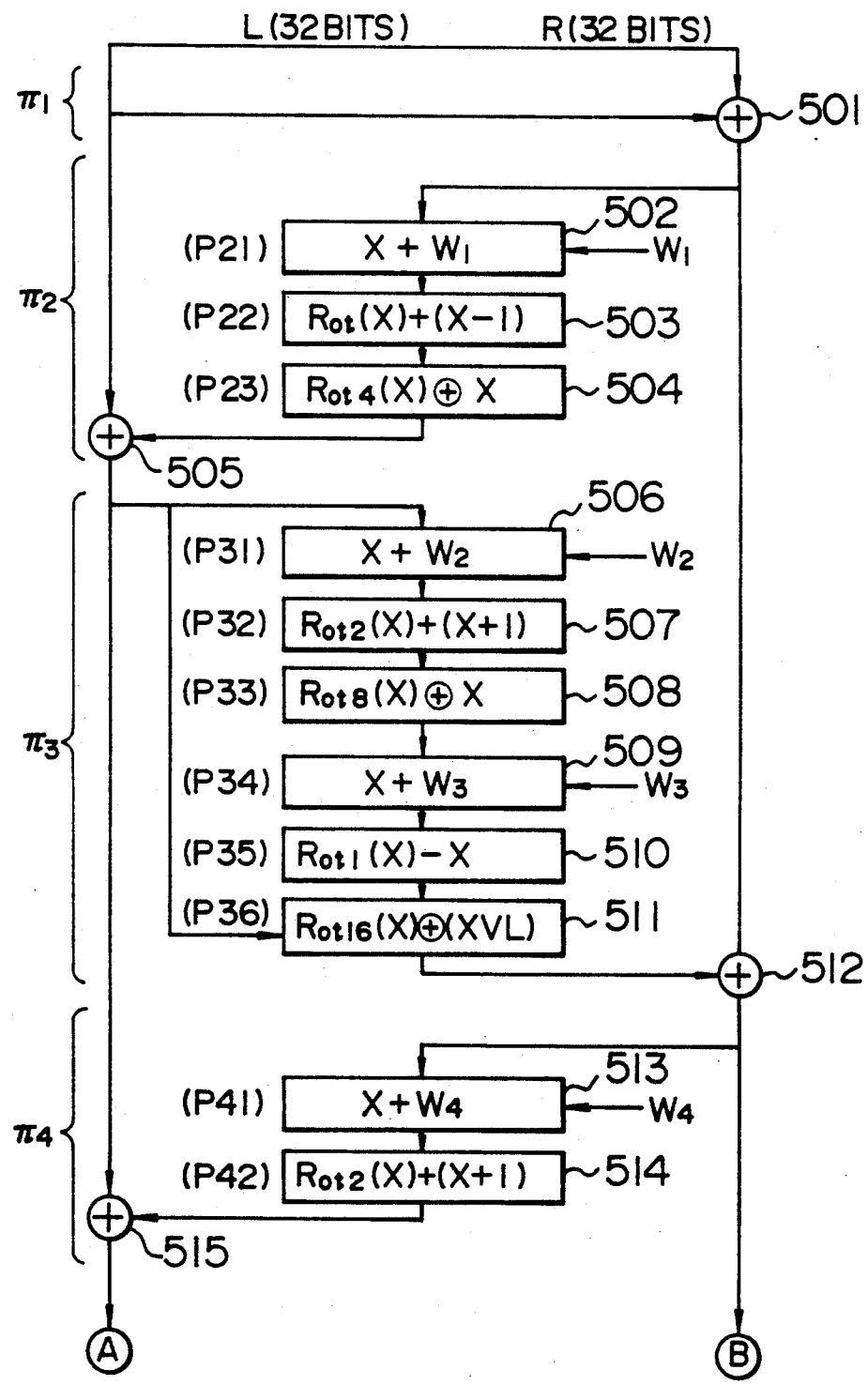
FIGS. 6A and 6B are diagrams for showing a flow chart of the cipher program A.
Figure 6B:
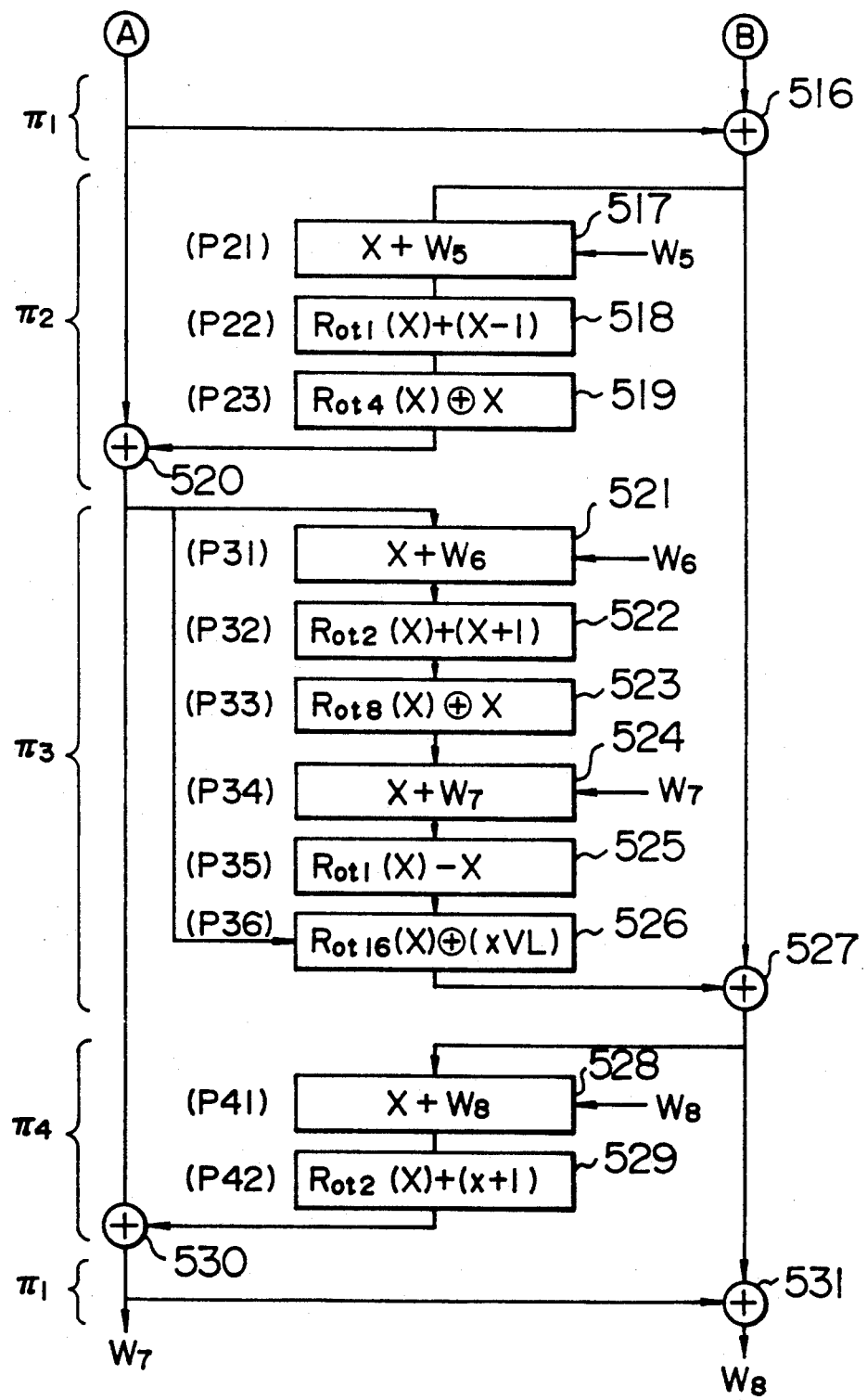

In the above-described Step 203, the cipher program A (102) shown in FIGS. 5A and 5B is executed for each row. FIGS. 6A and 6B show flow charts which correspond to each step shown in FIGS. 5A and 5B.

Symbols in FIGS. 5A and 5B are defined as follows.
Ln : Circular shifts data to the left (in the direction of the lower bits) by n bits.
Rn : Circular shifts data to the right (in the direction of the higher bits) by n bits.
EOR : Obtain an exclusive logical OR of data stored in the register X and data stored in other registers.
+ : A modular addition of modulus $2^{32}$ using data stored in the register X and data to be inputted to a gate A.
− : A modular subtraction of modulus $2^{32}$ using data stored in the register X and data to be inputted to the gate A.
+ +1 : A modular addition of modulus $2^3$ using data stored in the register X added by 1, and other data.
+ −1 : A modular addition of modulus $2^3$ using data stored in the register X added by −1, and other data.
− +1 : A modular subtraction of modulus $2^3$ using data stored in the register X added by 1, and other data.
− −1 : A modular subtraction of modulus $2^3$ using data stored in the register X added by −1, and other data.
V : A logical OR for each bit.
∧ : A logical AND for each bit.
[Wn] : Becomes an output destination only when a register Wn is a key schedule.

The processing in Step 501 in FIG. 5 shows that the register R (403) becomes an input to a gate A (412), the number of rotation is zero, an arithmetic operation other than the rotation is OR, and the result of the arithmetic operation has been inputted to the register R (403).

When detailed numerical values are used, the above processing is as follows. The numerical values are expressed in hexadecimal notation. "0000000000000000" is given as the algorithm determination key A (105) of 64-bit length, and eight "00000000" are given as the system key A (111) of eight 32-bit length.

In other words, higher 32-bit length data "00, - - - , 0" is stored in the registers L (401) and X (402), lower 32-bit length data "00, - - - ,0" is stored in the register R (403), and "00, - - - ,0" is stored in the registers $W_1$ (404) to $W_8$ (411).

In Step 501, an exclusive logical OR is taken for the data stored in the registers X (402) and R (403), and a result "00000000" is stored in the registers X (402) and R (403) respectively.

In Step 502, a sum is taken for the data stored in the registers X (402) and $W_1$ (404), and a result "00000000" is stored in the register X.

In step 503, a sum is taken for the data stored in the register X (402) added by −1, and the data stored in the register X which has been circular shifted to the left by one bit, and a result "ffffffff" is stored in the register X (402).

In Step 504, an exclusive logical OR is taken for the data stored in the register X (402) and the data stored in the register X (402) which has been circular shifted to the left by four bits, and a result "00000000" is stored in the register X (402).

In Step 505, an exclusive logical OR is taken for the data stored in the register X (402) and the data stored in the register L (401), and a result "00000000" is stored in the registers X (402) and L (401) respectively. Since the cipher program A (102) is for generating the algorithm determination key B (that is, the cipher program A is a program for the key schedule), it is so designed that "00000000" is also stored in the register W (404).

In Step 506, a sum is taken for the data stored in the register X (402) and the data stored in the register Wz (405), and a result "00000000" is stored in the register X.

In Step 507, a sum is taken for the data stored in the register X (402) added by +1, and the data stored in the register X (402) which has been circular shifted to the left by two bits, and a result "00000000" is stored in the register X.

In Step 508, an exclusive logical OR is taken for the data stored in the register X (402), and the data stored in the register X (402) which has been circular shifted to the left by eight bits, and a result "00000000" is stored in the register X (402).

In Step 509, a sum is taken for the data stored in the register X (402) and the data stored in the register $W_3$ (406), and a result "00000101" is stored in the register X.

In Step 510, a difference is calculated between the data stored in the register X (402) circular shifted to the left by one bit and the data stored in the register X (402), and a result "00000101" is stored in the register X (402).

In Step 511, a logical OR is taken for the data stored in the register X (402) and the data stored in the register L (401) for each bit, then an exclusive logical OR is taken for a result of the logical OR, "00000101", and the data stored in the register X which has been shifted to the left by 16 bits, and a result "01010101" is stored in the register X.

In Step 512, an exclusive logical OR is taken for the data stored in the register X (402) and the data stored in the register R (403), and a result "01010101" is stored in the registers X (402) and R (403), respectively. Since this is a phase of the key schedule, "01010101" is also stored in the register $W_2$.

In Step 513, a sum is taken for the data stored in the register X (402) and the data stored in the register $W_4$ (407), and a result "01010101" is stored in the register X (402).

In Step 514, a sum is taken for the data stored in the register X (402) added by +1, and the data stored in the register X (402) which has been circular shifted to the left by two bits, and a result "05050506" is stored in the register X (402).

In Step 515, an exclusive logical OR is taken for the data stored in the register X (402) and the data stored in the register L (401), and a result "05050506" is stored in the registers X (402) and L (401). Since this is a phase of the key schedule, "05050506" is also stored in the register $W_3$ (406).

Figures 7, 8:
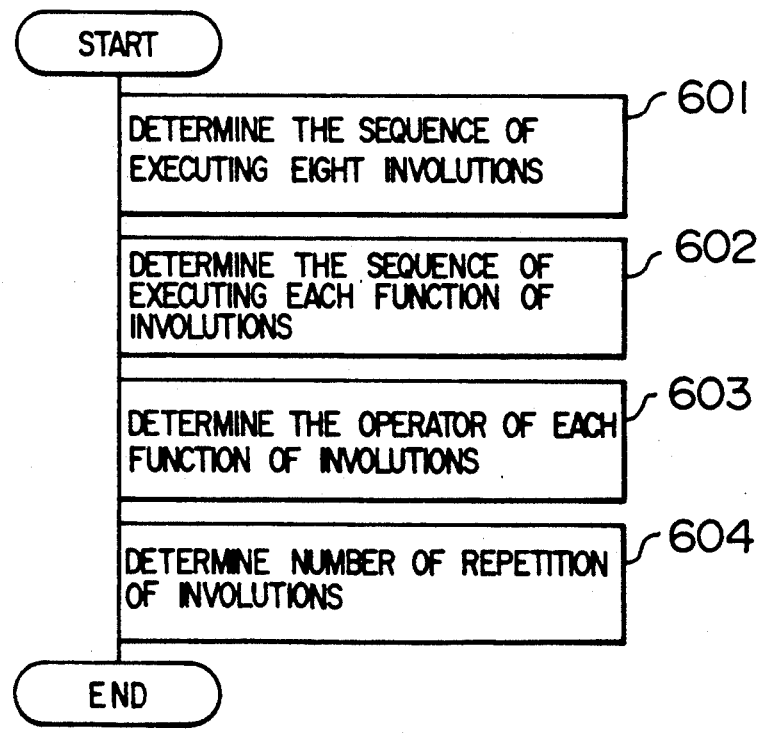
FIG. 7 is a diagram for showing a bit pattern of an algorithm key B that has been generated by executing the cipher program A.
FIG. 8 is a diagram for showing a procedure for processing a cipher program generation function.

A similar processing is repeated hereinafter and an involution $\pi_1$ is executed. As a result, data as shown in FIG. 7 are obtained in the registers $W_7$ (410) and $W_8$ (411). A total of 64 bits in the registers $W_7$ (410) and $W_8$ (411) is outputted as the algorithm determination key B (107).

The processing procedure (204) for generating the encryption program B will be explained in detail with reference to FIG. 8.

Figure 9:
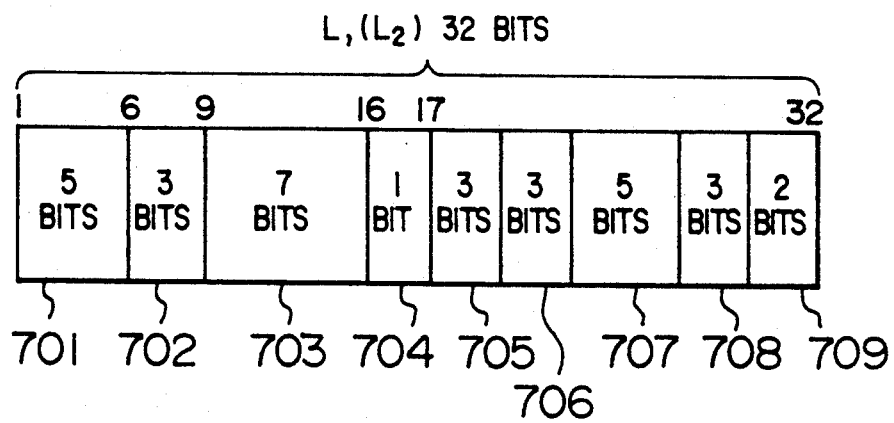
FIG. 9 is a diagram for showing a configuration of the algorithm key B.

In Step 204 mentioned above, the cipher program A (102) is transformed is accordance with an algorithm transformation rule to be explained below, by using the algorithm determination key B (107). Of the algorithm determination key B (107), the 32 bits stored in the register $W_7$ (410) are expressed as $L_1$ and the 32 bits stored in the register $W_8$ (411) are expressed as $L_2$. A structure of $L_1$ and $L_2$ is fixed as shown in FIG. 9 respectively.

The algorithm transformation rule is as follows.

Step 601 : By looking at the first to the fifth bits of $L_1$ (701), the former half involution $\pi_1$ to $\pi_4$ of MULTI2 (the above-described U.S. Pat. No. 4,982,429 the disclosure of which is incorporated herein by reference) are determined, and the sequence of executing the latter half involutions $\pi_1$ to $\pi_4$ is determined by the first to the fifth bits of $L_2$. The sequence of execution is determined so that the permutation of subscripts of the involutions $\pi_1$ to $\pi_4$ increases each time when a binary number expressed by the first to the fifth bits increases by one, such as, for example, the execution sequence is $\pi_1 \pi_2 \pi_3 \pi_4$ when the first to the fifth bits (701) are expressed as "00000", and the execution sequence is $\pi_1 \pi_2 \pi_4 \pi_3$ when the first to the fifth bits (701) are expressed as "00001".

A similar allocation is continued to be carried out until the execution sequence is returned to $\pi_1 \pi_2 \pi_3 \pi_4$ when the first to the fifth bits (701) are expressed as 4!="11000", and the execution sequence is $\pi_2 \pi_1 \pi_0 \pi_4$ $\pi_3$ when the first to the fifth bits are expressed as "11111".

When the execution sequence of each involution has been altered from an even order to an odd order or from an odd order to an even order as compared with the initial execution sequence ($\pi_1, \pi_2, \pi_3, \pi_4$) as a result of an allocation, the input and output data of 32 bits on both the right and left sides of the involution are substituted with each other.

Step 602 : By looking at the sixth to the 16th bits (702 to 704) of $L_1$, the execution sequence of each of the functions ($P_{21}$ to $P_{23}$, $P_{31}$ to $P_{36}$ and $P_{41}$ to $P_{42}$) within the former half involutions $\pi_1$ to $\pi_4$ is determined, and the execution sequence of each function with the latter half involutions $\pi_1$ to $\pi_4$ is determined by the sixth to the 16th bits of $L_2$. To be more specific, the execution sequence of the functions $P_{21}$ to $P_{23}$ within $\pi_2$ is determined by the sixth bit to the eighth bit (702), the execution sequence of the functions $P_{31}$ to $P_{36}$ within $\pi_3$ is determined by the ninth bit to the 15th bit (703), and the execution sequence of the functions $P_{41}$ to $P_{42}$ within $\pi_4$ is determined by the 16th bit (704). The method of determining the execution sequence is the same as that in Step 601. When each bit is zero, the execution sequence is the same as that of the cipher program A (102), and with all the zero bits as a starting point, the execution sequence is allocated so that the numerical value itself of a permutation of subscripts of a function becomes an increasing sequence of numbers. After the permutation has completed one circulation, a permutation same as the starting point is allocated next, and a similar allocation is carried out.

Step 603 : By looking at the 17th bit to the 32nd bit (705 to 709) of $L_1$, a part within the functions of the former half involutions $\pi_2$ to $\pi_4$ is determined, and a part within the functions of the latter half involutions $\pi_2$ to $\pi_4$ is replaced by the 17th bit to the 32nd bit of $L_2$. For example, operators of the functions $P_{22}$, $P_{32}$, $P_{35}$, $P_{36}$ and $P_{42}$ are altered in accordance with the bit pattern of each area as shown in FIGS. 10A to 10F.

Step 604 : By looking at the upper eight bits of the algorithm determination key A (105), the number of repeating the involutions is determined. In other words, when the upper eight bits are "00000000", eight involutions that have been determined by Step 603 are executed. When the upper eight bits are "00000001", the former four involutions are repeated once after the eight involutions have been executed. Thereafter, each time when a numerical value increases by one, the former and the latter four involutions are added alternately. When the higher bits is "11111111", the former four involutions are repeated once after the eight involutions determined by Step 603 have been repeated by 128 times.

In the case of using the bit sequences shown in FIG. 7 as $L_1$ and $L_2$, the bit strings are transformed into the algorithms as shown in FIGS. 11A, 11B and 11C. In this case, since the upper eight bits of the algorithm determination key A (105) is "00000000", eight involutions are executed. In other words, one block of 64-bit data is enciphered by 30 machine instructions.

The encryption program which has been determined in the above-described procedure is used as the cipher program B (103) to execute the encipherment of the plaintext 109.

Next, encipherment processings (205, 206) will be explained.

The Step 206 in FIG. 2 is further divided into a process of generating data execution keys ($K_1$ to $K_8$) from the data key (108) and the system key B (112), and a process of enciphering the plaintext (109) by using the data execution keys.

Figure 12:
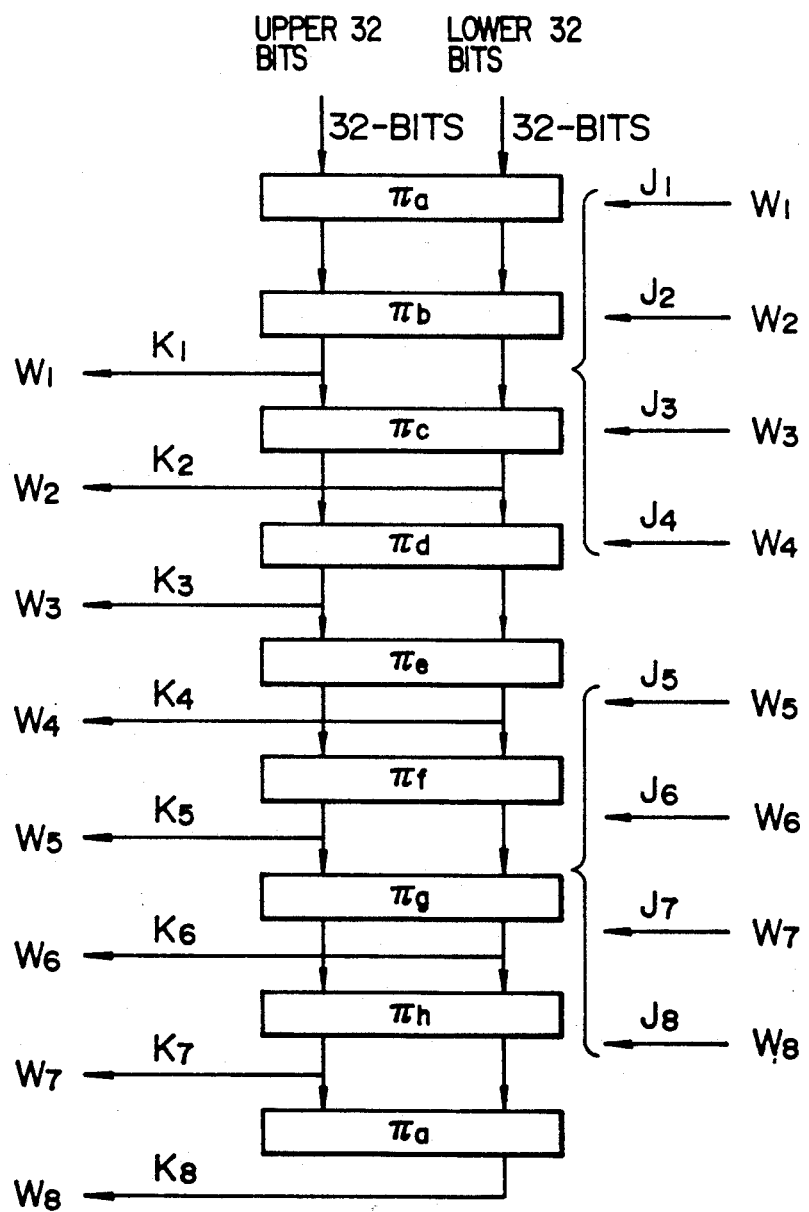
FIGS. 12 and 13 are diagrams for explaining a general flow chart of the cipher program B.

Assume that, of the cipher program B generated by the support processor 101, four involution functions generated by the higher 32 bits of the algorithm determination key B is expressed as $\pi_a$, $\pi_b$, $\pi_c$ and $\pi_d$, and four involution functions generated by the lower 32 bits of the algorithm determination key B are expressed as $\pi_e$, $\pi_f$, $\pi_g$ and $\pi_h$. Then, the process for generating the data execution keys ($K_1$ to $K_8$) is executed by nine involution functions of $\pi_a$, $\pi_b$, $\pi_c$, $\pi_d$, $\pi_3$, $\pi_f$, $\pi_g$, $\pi_h$ and $\pi_a$. FIG. 12 shows a flow chart of the process for generating the data execution keys ($K_1$ to $K_8$).

Assume that L and Lz shown in FIG. 7 represent the higher bits and the lower bits of the algorithm determination key B, the process for generating the data execution keys ($K_1$ to $K_8$) is structured by nine involution functions of $\pi_3$, $\pi_1$, $\pi_4$, $\pi_2$, $\pi_1$, $\pi_3$, $\pi_2$, $\pi_4$ and $\pi_3$.

In the process of generating the data execution keys ($K_1$ to $K_8$), the system key B (112) is first divided into $J_1$ to $J_8$, which are then stored in the registers $W_1$ (404) to $W_8$ (411) in advance. The higher 32 bits of the data key (108) are written in the registers L (401) and X (402), and the lower 32 bits are written in the register R (403). When the processing of the key schedule (the processing for writing to the register [$W_x$] in the column of output) in the program of FIG. 11 has been executed, the data execution keys ($K_1$ to $K_8$) are obtained in the registers $W_1$ (404) to $W_8$ (411).

Figure 13:
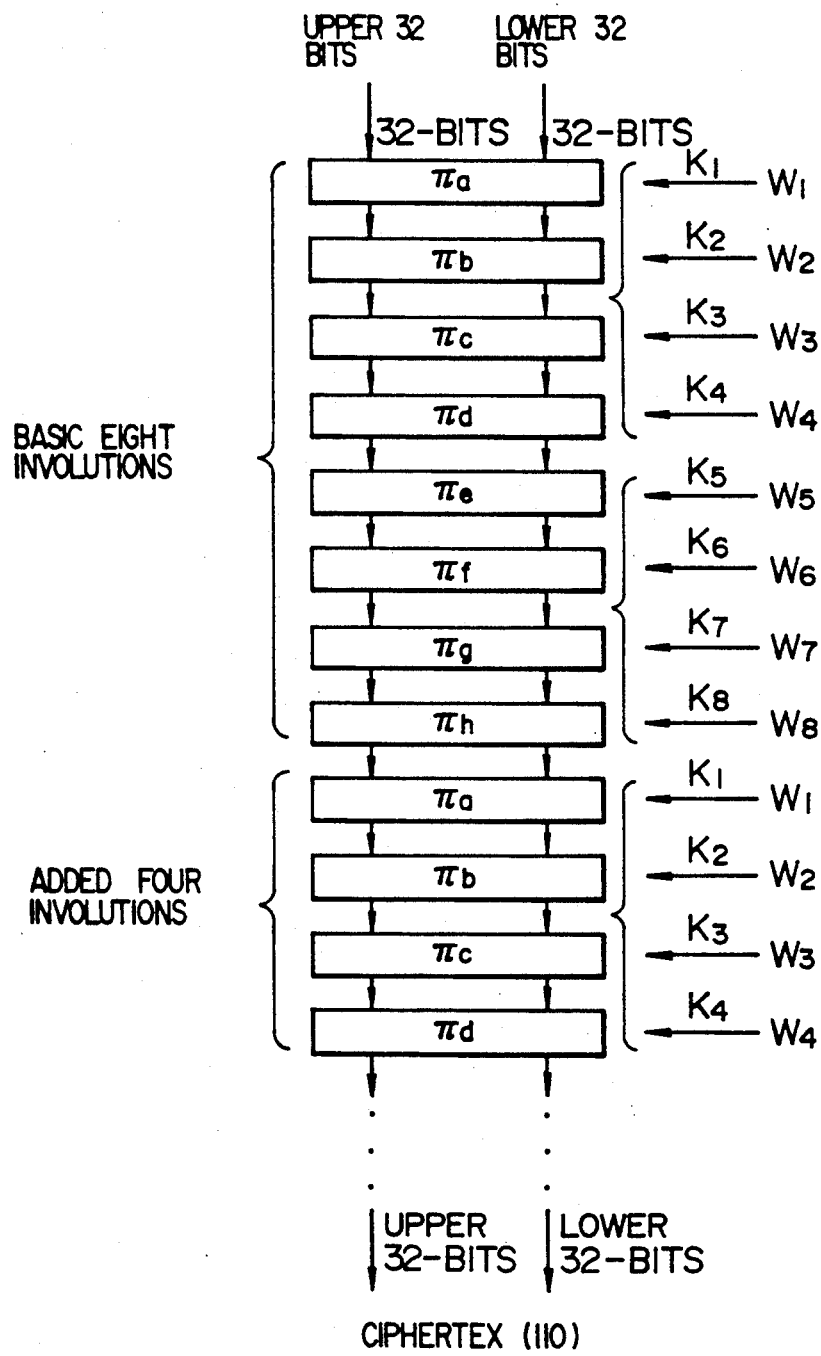

Next, a flow chart for the encipherment process is shown in FIG. 13.

FIG. 13 shows the case of repeating involutions, by a plurality of times, and the involution ($\pi_a$) of the last stage is omitted.

When the upper eight bits of the algorithm determination key A is "00000000", the number of involutions is the same as that of FIG. 12.

Of one block of 64-bit plain data, the upper 32 bits are written in the registers L (401) and X (402) and the lower 32 bits are written in the register R (403). Then, the cipher program B (a processing of writing to the register [$W_x$] in the column of output) is executed. As a result of the above processing, the upper 32 bits of the ciphertext are obtained in the register L (401) and the lower 32 bits of the ciphertext are obtained in the register R (403).

The ciphertext is deciphered by executing the involutions in the sequence opposite to that executed in the encipherment process, to thereby obtain the original plaintext.

Although a processor consisting of 12 32-bit registers and three 32-bit arithmetic circuits has been used in FIG. 4, a general-purpose processor having a different configuration from that of the processor shown in FIG. 4 may also be used to structure a software to carry out a processing similar to that of the present embodiment.

Although the left circular shift of four bits, eight bits and 16 bits has been fixed in FIGS. 5A and 5B and FIGS. 11A to 11C, the right circular shift of the four bits, eight bits and 16 bits may also be used. Alternately, the numbers of bits may be changed to five bits, nine bits and 17 bits, for example, with either the left or right circular shift, to have an effective bit scrambling. It is also effective to have different numbers of bits depending on program transformations, such as, for example, four bits, eight bits and 16 bits are used to carry out the left circular shift before the cipher program transformation and three bits, eight bits and 18 bits are used to carry out the left circular shift after the transformation.

Although 64 bits have been used as a bit length for the algorithm determination key A (105) and the data key (108) in the present embodiment, 128 bits may also be used for these keys.

In other words, in the case of having a 128-bit length for the algorithm determination key A (105), any desired two data $I_\alpha$ and $I_\beta$ that are defined by the system among the data $I_1$ to $I_8$ of 32 bits $\times$ eight = 256 bits of the system key A (111) may be added to the original algorithm determination key A, to have the algorithm determination key A of a total 128-bit length. In this case, the system key A has the remaining 32 bits $\times$ 6 = 192-bit length.

Similarly, in the case of having a 128-bit length for the data key (108), any desired two data $I_\gamma$ and $I_\delta$ that are defined by the system among the data $J_1$ to $J_8$ of 32 bits $\times$ eight = 256 bits of the system key B (112) may be added to the original data, to have the data key of a total 128-bit length. In this case, the system key B has the remaining 32 bits $\times$ 6 = 192-bit length.

Figure 14A:
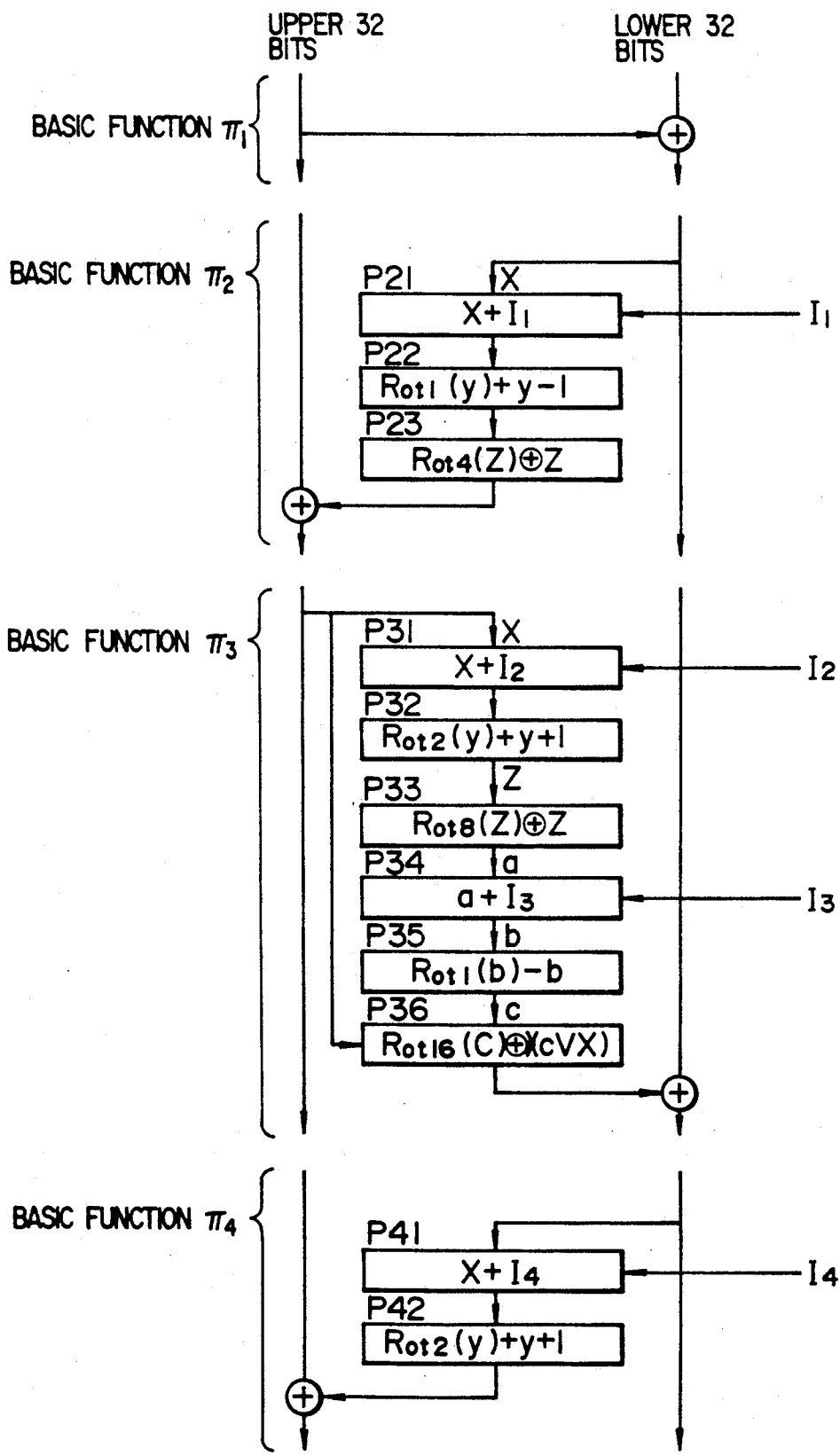
FIGS. 14A and 14B are diagrams for explaining basic involution functions and their modifications respectively.

In the above-described embodiment, as the basic functions of involutions are shown in FIG. 14A, the features of involutions that original data can be obtained when the data which has once been involution transformed is involution transformed again in the same manner, are utilized such that encipherment functions are obtained by executing a plurality of involutions and decipherment functions are obtained by executing the same involutions in the opposite sequence.

Figure 14B:
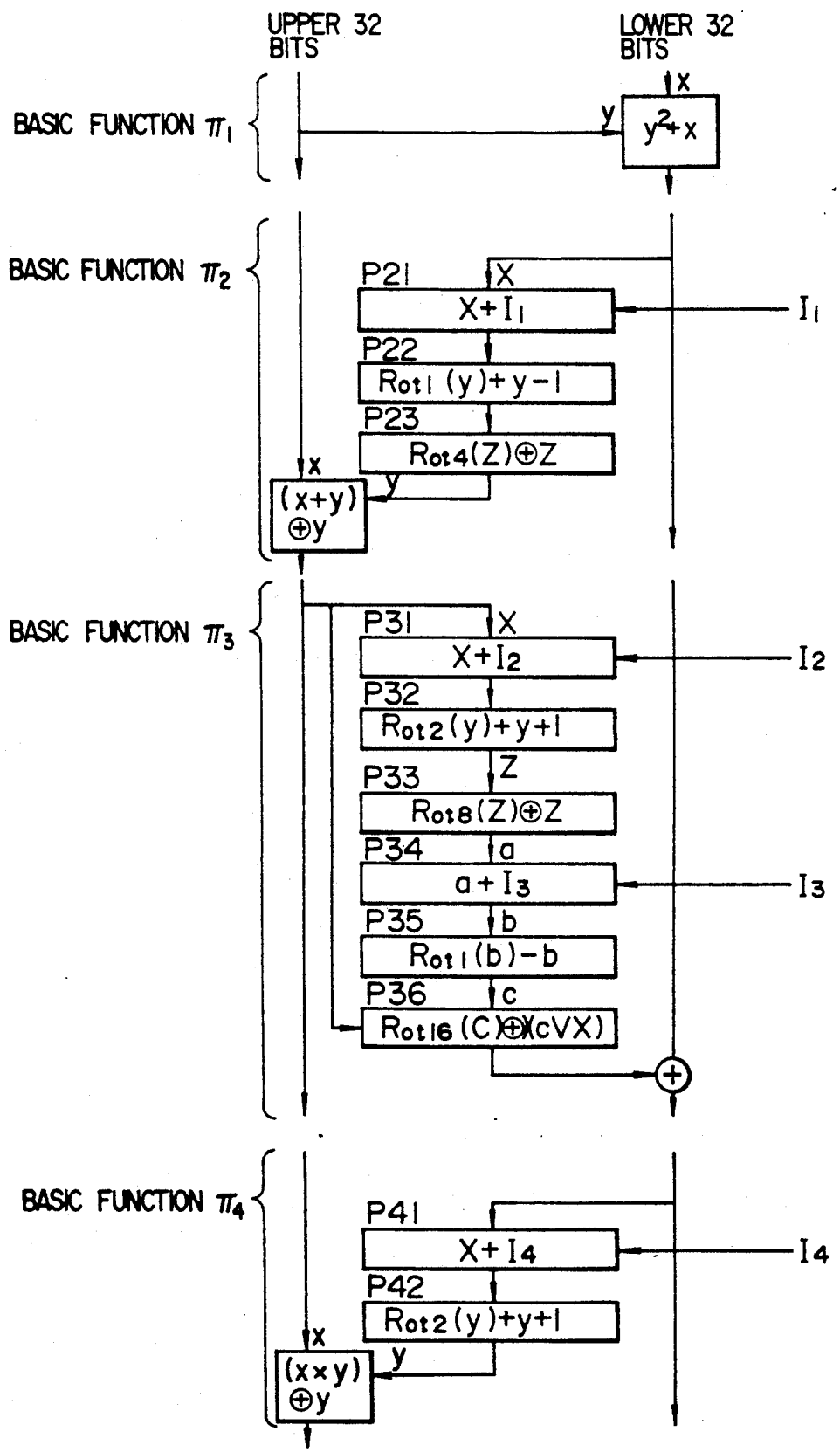

On the other hand, in the case of generating a compression code by using a plaintext as the system keys A and B, not for the purpose of enciphering and deciphering the plaintext, operators can be changed so that the functions do not have the features of involutions, to thereby generate unidirectional cipherment functions. FIG. 14B shows one example of this modification. Instead of taking an exclusive logical sum for each bit of a result of having made a functional transformation of the upper or lower 32 bits of input data and the remaining upper or lower 32 bits of the input data (that is, the form of $x \oplus y$), for example, other arithmetic operations such as $(x+y) \oplus y$ or $(X \ y, \oplus x)$ may be carried out to modify the basic functions so that the basic functions do not have the features of involutions.

Each of the above embodiments of the present invention is described in an article, written by the inventors of the present invention, entitled "On Differential Cryptanalysis" IEICE TRANSACTION, VOL. E 74, No. 8, AUGUST 1991, pp 2153-2159, and the content of the article is incorporated herein by reference.

According to the present invention, the magnitude of encryption can be reinforced when the processing is divided into two stages of the processing for determining encipherment and decipherment functions based on the algorithm determination key A and the data key and the processing for carrying out encipherment and decipherment of data.

In the case of limiting the cipher program to be generated by the present invention to the processing of eight involutions, there exist variations of at least $2^{63}$ algorithms, which is powerful against a chosen plaintext-ciphertext attack. When the number of repetitions of involutions is increased by the upper eight-bit data of the algorithm key, a process for deciphering an encryption is far extremely complex.

Further, when the number of repetitions of involutions is greater than eight, data effective keys ($K_1$ to $K_8$) which have been used once are used repeatedly, so that most of the encipherment processings can be carried out among the registers. Thus, an aggravation in the speed of encryption processing due to an increase in the number of cyclic involutions can be minimized.

When a program including 1028 involution processings is executed by using the HITACHI Workstation 2050/32 (a product of Hitachi, Ltd.), for example, a cryptographic processing speed of at least 36 Kbps can be obtained. This speed is faster than 21 Kbps which is the speed estimated by an inverse proportional calculation based on 2.7 Mbps which is the speed obtained when a cipher program including eight involution processings is executed by using the same equipment.

We claim:

1. A cryptographic method for enciphering message data by combining a substitution transformation process and a permutation transformation process to scramble data using functions having mutually different combinations of operators, wherein, by using key data, at least one of the following steps is carried out:
   altering a sequence of executing at least one of said substitution transformation process and said permutation transformation process;
   altering functions of said substitution transformation process or said permutation transformation process; and
   altering a number of times said transformation processes are repeated.

2. A cyrptographic method for enciphering data of a predetermined length by combining a plurality of substitution transformation processes and permutation transformation processes to randomize data using functions having mutually different combinations of operators, wherein said substitution transformation processes and said permutation transformation processes are repeated at least a predetermined number of times by repetitively using the same key data.

3. A cryptographic method according to claim 1, wherein said permutation transformation processes includes an operation of circular shifting to the right or left by X bits and an operation of circular shifting to the right or left by Y bits, and X and Y being mutually different numbers;
   an indication of detailed numerical values of said X and Y and a circular shift direction of either right or left being given in accordance with key data.

4. A cryptographic method according to claim 1, wherein said substitution transformation step includes at least one of a circular shift process for shifting in the right or left direction, a modular addition process, a modular subtraction process, an exclusive logical sum process for each bit, a logical sum process for each bit, and a logical sum product process for each bit.
   an indication of how to combine said processes to structure said substitution transformation process being given in accordance with key data.

5. A one-way cryptographic method for transforming data by combining a plurality of substitution transformation processes and permutation transformation processes to scramble data using functions having mutually different combinations of operators, wherein at least one of the following steps is carried out in accordance with key data:
   altering a sequence of executing said substitution transformation processes and said permutation transformation processes;
   altering functions of said substitution transformation processes and said permutation transformation processes; and
   altering a number of times said transformation processes are repeated.

6. A one-way encipher method for transforming data by combining a plurality of substitution transformation processes and permutation transformation processes to scramble data, wherein said substitution transformation processes and permutation transformation processes are repeated at least a predetermined number of times by using the same key data.

7. A cryptographic apparatus, using a plurality of key data, for enciphering message data for each predetermined number of bits, comprising: means for generating a cipher program by combining a plurality of kinds of basic involution programs in the sequence of execution in accordance with first key data and/or combining functions for structuring said basic involution programs in accordance with said first key data; and means for transforming said message data into a ciphertext by executing said cipher program by using second key data.

8. A cryptographic method, using a plurality of key data, for enciphering message data for each predetermined number of bits, comprising the steps of: generating a cipher program by combining a plurality of kinds of basic involution programs that have been recorded in advance, in the sequence of execution in accordance with first key data and/or by altering the structure of said involution programs in accordance with said first key data; and transforming said message data into a ciphertext by executing said encryption program by using second key data.

9. A cryptographic apparatus for encihpering message data by combining a substitution transformation process and a permutation transformation process to randomize data using functions having mutually different combinations of operators, wherein an on-chip encipherment processor comprises:
   an input buffer for holding a plurality of kinds of input keys;
   a control program portion to which an encryption program and a transformation cipher program are inputted;
   arithmetic operation means for carrying out a predetermined operation based on key data from said input buffer, under the control of a program from said control program portion, to generate an algorithm determination key for generating a transformation cipher program, and for generating a ciphertext by carrying out a predetermined arithmetic operation based on message data; and
   an output buffer for holding and for outputting an algorithm determination key and message data that have been generated.

10. A cryptographic apparatus according to claim 9, wherein, in said on-chip processor, said arithmetic operation means includes:
   first and second set registers;
   a plurality of arithmetic units for carrying out repetitive operations based on outputs from said first and second set registers; and OR means for executing on AR of the outputs of said first and second set registers to produce an output of said arithmetic operation means;

wherein said first and second set registers receive inputs respectively of a first algorithm determination key for determining an algorithm which has been defined in advance between communicating parties and a system key that has been defined in advance between closed users;

wherein said plurality of arithmetic operation units repetitively carry out cryptographic operations for inputs from said first and second set registers to update said control program portion based on the results of said arithmetic operations and generate effective keys and set said effective keys in said second set register.

11. A cryptographic apparatus according to claim 10, wherein, in said on-chip processor, said arithmetic operation means, under the control of a transformation program from said updated control program portion, executes a predetermined cyclic cryptographic operation for said message data to be enciphered, based on an output from said first set register to which data keys defined by common parties have been inputted and an output from said second set register to which a second system key defined by closed users has been inputted, and outputs output data of said first set register as an enciphered message as a result of the execution of said cyclic cryptographic operation.

12. A cryptographic apparatus according to claim 11, wherein, in said on-chip processor, an interval for updating said first system key is much longer than an interval for updating said second system key.

* * * * *